US009773007B1

(12) United States Patent
Golden et al.

(10) Patent No.: US 9,773,007 B1
(45) Date of Patent: Sep. 26, 2017

(54) PERFORMANCE IMPROVEMENTS IN A STORAGE SYSTEM

(71) Applicant: PURE Storage, Inc., Mountain View, CA (US)

(72) Inventors: Christopher Golden, Mountain View, CA (US); Neil Vachharajani, San Francisco, CA (US); David Grunwald, San Francisco, CA (US); Scott Smith, San Mateo, CA (US); Jianting Cao, Mountain View, CA (US); Luke Paulsen, Mountain View, CA (US); Ricardo Gonzalez, Palo Alto, CA (US)

(73) Assignee: Pure Storage, Inc., Mountain View, CA (US)

( * ) Notice: Subject to any disclaimer, the term of this patent is extended or adjusted under 35 U.S.C. 154(b) by 326 days.

(21) Appl. No.: 14/556,611

(22) Filed: Dec. 1, 2014

(51) Int. Cl.
  *G06F 17/30* (2006.01)
  *G06F 12/08* (2016.01)
(52) U.S. Cl.
  CPC ........ *G06F 17/30088* (2013.01); *G06F 12/08* (2013.01)
(58) Field of Classification Search
  CPC ........ G06F 17/30153; G06F 17/30595; G06F 17/30961; G06F 17/30345; G06F 17/30575; G06F 17/30091; G06F 17/30044; G06F 17/30156; G06F 11/1088; G06F 11/1541; G06F 17/30088; G06F 12/08; G06Q 30/06
  See application file for complete search history.

(56) References Cited

U.S. PATENT DOCUMENTS

| 5,208,813 | A  | 5/1993 | Stallmo |
| 5,940,838 | A  | 8/1999 | Schmuck et al. |
| 6,263,350 | B1 | 7/2001 | Wollrath et al. |
| 6,412,045 | B1 | 6/2002 | DeKoning et al. |
| 6,718,448 | B1 | 4/2004 | Ofer |

(Continued)

FOREIGN PATENT DOCUMENTS

| CN | 103370685 A | 10/2013 |
| CN | 103370686 A | 10/2013 |

(Continued)

OTHER PUBLICATIONS

Microsoft Corporation, "GCSettings.IsServerGC Property", Retrieved Oct. 27, 2013 via the WayBack Machine, 3 pages.

(Continued)

*Primary Examiner* — Anh Ly
(74) *Attorney, Agent, or Firm* — Edward J. Lenart; Kennedy Lenart Spraggins LLP

(57) ABSTRACT

Systems, methods, and computer readable storage mediums for optimizing performance in a storage system. A volume may be mapped to an anchor medium through an indirection layer. When a snapshot is taken of the volume, the allocation of a new anchor medium is delayed until a write operation targeting the volume is received. When a write operation targeting the volume is received, a new anchor medium may be allocated for only a portion of the volume corresponding to the portion of the volume which is targeted by the write operation. Also, when a snapshot is taken of the volume, read optimization operations are performed only the portions of the volume which have changed since the previous snapshot.

14 Claims, 11 Drawing Sheets

(56) References Cited

U.S. PATENT DOCUMENTS

| | | | |
|---|---|---|---|
| 6,757,769 B1 | 6/2004 | Ofer | |
| 6,799,283 B1 | 9/2004 | Tamai et al. | |
| 6,834,298 B1 | 12/2004 | Singer et al. | |
| 6,850,938 B1 | 2/2005 | Sadjadi | |
| 6,915,434 B1 | 7/2005 | Kuroda | |
| 6,963,952 B1* | 11/2005 | La | G11B 7/0045 369/30.03 |
| 6,968,345 B1* | 11/2005 | Muhlestein | G06F 17/30067 707/824 |
| 6,973,549 B1 | 12/2005 | Testardi | |
| 7,028,216 B2 | 4/2006 | Aizawa et al. | |
| 7,039,827 B2 | 5/2006 | Meyer et al. | |
| 7,216,164 B1 | 5/2007 | Whitmore et al. | |
| 7,243,115 B2* | 7/2007 | Manley | G06F 11/2066 707/E17.01 |
| 7,873,619 B1 | 1/2011 | Faibish et al. | |
| 7,913,300 B1 | 3/2011 | Flank et al. | |
| 8,352,540 B2 | 1/2013 | Anglin et al. | |
| 8,527,544 B1* | 9/2013 | Colgrove | G06F 3/0608 707/791 |
| 8,560,747 B1 | 10/2013 | Tan et al. | |
| 8,631,215 B1* | 1/2014 | Verma | G06F 3/0605 711/111 |
| 8,700,875 B1 | 4/2014 | Barron et al. | |
| 8,874,850 B1* | 10/2014 | Goodson | G06F 12/0875 711/133 |
| 9,423,967 B2 | 8/2016 | Colgrove et al. | |
| 9,436,396 B2 | 9/2016 | Colgrove et al. | |
| 9,436,720 B2* | 9/2016 | Colgrove | G06F 3/0619 711/166 |
| 9,454,476 B2 | 9/2016 | Colgrove et al. | |
| 9,454,477 B2 | 9/2016 | Colgrove et al. | |
| 9,513,820 B1 | 12/2016 | Shalev | |
| 9,516,016 B2 | 12/2016 | Colgrove et al. | |
| 2002/0038436 A1 | 3/2002 | Suzuki | |
| 2002/0078335 A1* | 6/2002 | Cabrera | G06F 3/0607 713/1 |
| 2002/0087544 A1 | 7/2002 | Selkirk et al. | |
| 2004/0049572 A1 | 3/2004 | Yamamoto et al. | |
| 2005/0066095 A1* | 3/2005 | Mullick | G06F 17/30171 710/200 |
| 2006/0074940 A1 | 4/2006 | Craft et al. | |
| 2006/0155946 A1 | 7/2006 | Ji | |
| 2007/0067585 A1 | 3/2007 | Ueda et al. | |
| 2007/0171562 A1 | 7/2007 | Maejima et al. | |
| 2007/0220313 A1 | 9/2007 | Katsuragi et al. | |
| 2008/0059699 A1 | 3/2008 | Kubo et al. | |
| 2008/0065852 A1 | 3/2008 | Moore et al. | |
| 2008/0155191 A1 | 6/2008 | Anderson et al. | |
| 2008/0178040 A1 | 7/2008 | Kobayashi | |
| 2008/0209096 A1 | 8/2008 | Lin et al. | |
| 2008/0244205 A1 | 10/2008 | Amano et al. | |
| 2008/0275928 A1 | 11/2008 | Shuster | |
| 2008/0285083 A1 | 11/2008 | Aonuma | |
| 2009/0006587 A1 | 1/2009 | Richter | |
| 2009/0037662 A1 | 2/2009 | La Frese et al. | |
| 2009/0204858 A1 | 8/2009 | Kawaba | |
| 2009/0228648 A1 | 9/2009 | Wack | |
| 2010/0067706 A1 | 3/2010 | Anan et al. | |
| 2010/0153620 A1 | 6/2010 | McKean et al. | |
| 2010/0191897 A1 | 7/2010 | Zhang et al. | |
| 2010/0250802 A1* | 9/2010 | Waugh | G06F 13/4022 710/100 |
| 2010/0250882 A1 | 9/2010 | Hutchison et al. | |
| 2010/0281225 A1 | 11/2010 | Chen et al. | |
| 2010/0287327 A1* | 11/2010 | Li | G06F 12/0246 711/3 |
| 2011/0167221 A1 | 7/2011 | Pangal et al. | |
| 2011/0238634 A1 | 9/2011 | Kobara | |
| 2012/0023375 A1 | 1/2012 | Dutta et al. | |
| 2012/0198175 A1 | 8/2012 | Atkisson | |
| 2013/0042052 A1 | 2/2013 | Colgrove et al. | |
| 2013/0046995 A1 | 2/2013 | Movshovitz | |
| 2013/0047029 A1 | 2/2013 | Ikeuchi et al. | |
| 2013/0091102 A1 | 4/2013 | Nayak | |
| 2013/0205110 A1 | 8/2013 | Kettner | |
| 2013/0227236 A1* | 8/2013 | Flynn | G11C 16/26 711/165 |
| 2013/0290648 A1* | 10/2013 | Shao | G06F 12/04 711/154 |
| 2013/0318314 A1 | 11/2013 | Markus et al. | |
| 2013/0339303 A1 | 12/2013 | Potter et al. | |
| 2014/0089730 A1 | 3/2014 | Watanabe et al. | |
| 2014/0172929 A1 | 6/2014 | Sedayao et al. | |
| 2014/0195762 A1* | 7/2014 | Colgrove | G06F 3/0619 711/166 |
| 2014/0229131 A1 | 8/2014 | Cohen et al. | |
| 2014/0281308 A1 | 9/2014 | Lango et al. | |
| 2015/0234709 A1 | 8/2015 | Koarashi | |
| 2015/0244775 A1 | 8/2015 | Vibhor et al. | |
| 2015/0278534 A1 | 10/2015 | Thiyagarajan et al. | |
| 2016/0019114 A1 | 1/2016 | Han et al. | |
| 2016/0098191 A1* | 4/2016 | Golden | G06F 3/061 711/162 |
| 2016/0098199 A1* | 4/2016 | Golden | G06F 3/0604 711/102 |

FOREIGN PATENT DOCUMENTS

| | | |
|---|---|---|
| EP | 3066610 A1 | 9/2016 |
| EP | 3082047 A1 | 10/2016 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-99/13403 A1 | 3/1999 |
| WO | WO-2008/102347 A1 | 8/2008 |
| WO | WO-2010/071655 A1 | 6/2010 |

OTHER PUBLICATIONS

Microsoft Corporation, "Fundamentals of Garbage Collection", Retrieved Aug. 30, 2013 via the WayBack Machine, 11 pages.

* cited by examiner

PERFORMANCE IMPROVEMENTS IN A STORAGE SYSTEM

BACKGROUND

Technical Field

Embodiments described herein relate to storage systems, and more particularly, to techniques for improving the performance of various operations in a storage system.

Description of the Related Art

Various applications executing on a computer system may store and access data stored on one or more storage devices of a storage system. As the data is modified over time, the storage system will keep track of the changes, update mappings, and free up storage locations corresponding to deleted data so that these storage locations can be used for new data.

Accordingly, a typical storage system may execute background operations (e.g., garbage collection operations, read optimization operations) to reduce the complexity of the mappings and data stored on the storage system. However, these processes may be inefficient if they are scanning the entire address space of a volume every time a new snapshot of the volume is taken, especially if only a small portion of the volume has changed since the previous snapshot was taken.

SUMMARY

Various embodiments of systems and methods for improving the performance of various operations in a storage system are contemplated.

In one embodiment, a storage system may include one or more storage subsystems, with each storage subsystem including one or more storage controllers and one or more storage devices. In one embodiment, the storage controller may utilize volumes and mediums to track stored client data. A medium may be defined as a logical grouping of data. In various embodiments, each volume may be mapped to an indirection layer which may or may not be in a read-only state, with the indirection layer being mapped to one or more anchor mediums which are in a read-write state. The anchor medium(s) for a given volume may be mapped to any number of levels of underlying mediums in a medium hierarchy of the given volume.

In one embodiment, the storage controller may be configured to associate the portion of a volume which is being read-optimized to the portion of the volume that is experiencing overwrites. The storage controller may make the association between these portions by allocating an indirection layer between a volume and its corresponding anchor medium(s). The indirection layer may be an entity which maps the volume to its current anchor medium(s), wherein the current anchor medium(s) are read-write medium(s) which accept writes for their host volume.

In one embodiment, a first volume may have an indirection layer and a first anchor medium in a read-write state, wherein the first volume maps directly to the indirection layer, and wherein the first anchor medium directly underlies the indirection layer. When a snapshot is taken of the first volume, the indirection layer may remain as the direct link between the first volume and its underlying mediums. In addition, as a result of the snapshot being taken, all of the ranges in the first anchor medium may be marked as read-only. However, a new medium may not be allocated at the time of the snapshot being taken. Rather, once a first write operation targeting the first volume is received after the snapshot is taken, the storage controller may allocate a second anchor medium in the read-write state, and the second anchor medium may be inserted between the indirection layer and the first anchor medium in the medium hierarchy of the first volume. In other words, after the second anchor medium is allocated and inserted into the first volume's medium hierarchy, the indirection layer will be mapped directly to the second anchor medium, and the second anchor medium will be mapped directly to the first anchor medium. The second anchor medium may be the same size as the region of the first volume being targeted by the first write operation, such that the second anchor medium may be smaller than the first anchor medium. Then, after the second anchor medium is allocated, the first write operation may be performed to the second anchor medium.

In one embodiment, an extended copy (or xcopy) operation may be performed to copy data from a first portion of a second volume to a third volume. The second volume may include at least a second portion which is not being copied by the xcopy operation. In response to detecting the xcopy operation of the first portion of the second volume, the first portion of the current anchor medium of the second volume may be put in the read-only state. Additionally, read optimization operations may be performed for a first portion of the second volume, rather than the entire second volume. While the first portion of the current anchor medium is put in the read-only state, a second portion of the current anchor medium that corresponds to the second portion of the second volume may be kept in the read-write state. At a later point in time, when a write operation targeting the first portion of the second volume is received, the storage controller may be configured to allocate a new anchor medium for only the first portion of the second volume while the previous anchor medium may remain in place for the second portion of the second volume.

In one embodiment, the storage controller may be configured to limit the number of levels of mediums in the medium hierarchy of the first volume. In response to determining that the number of levels of mediums in the medium hierarchy of the first volume has exceeded a threshold (which may be programmable), the storage controller may be configured to perform read optimization operations on the first volume to reduce the number of levels in the medium hierarchy. The storage controller may also be configured to maintain a medium mapping table to track the mappings between mediums in the medium hierarchy of the first volume. In response to determining a size of the medium mapping table has exceeded a given threshold, the storage controller may be configured to reduce the threshold for the number of levels in the medium hierarchy of the first volume.

These and other embodiments will become apparent upon consideration of the following description and accompanying drawings.

Figure 1:
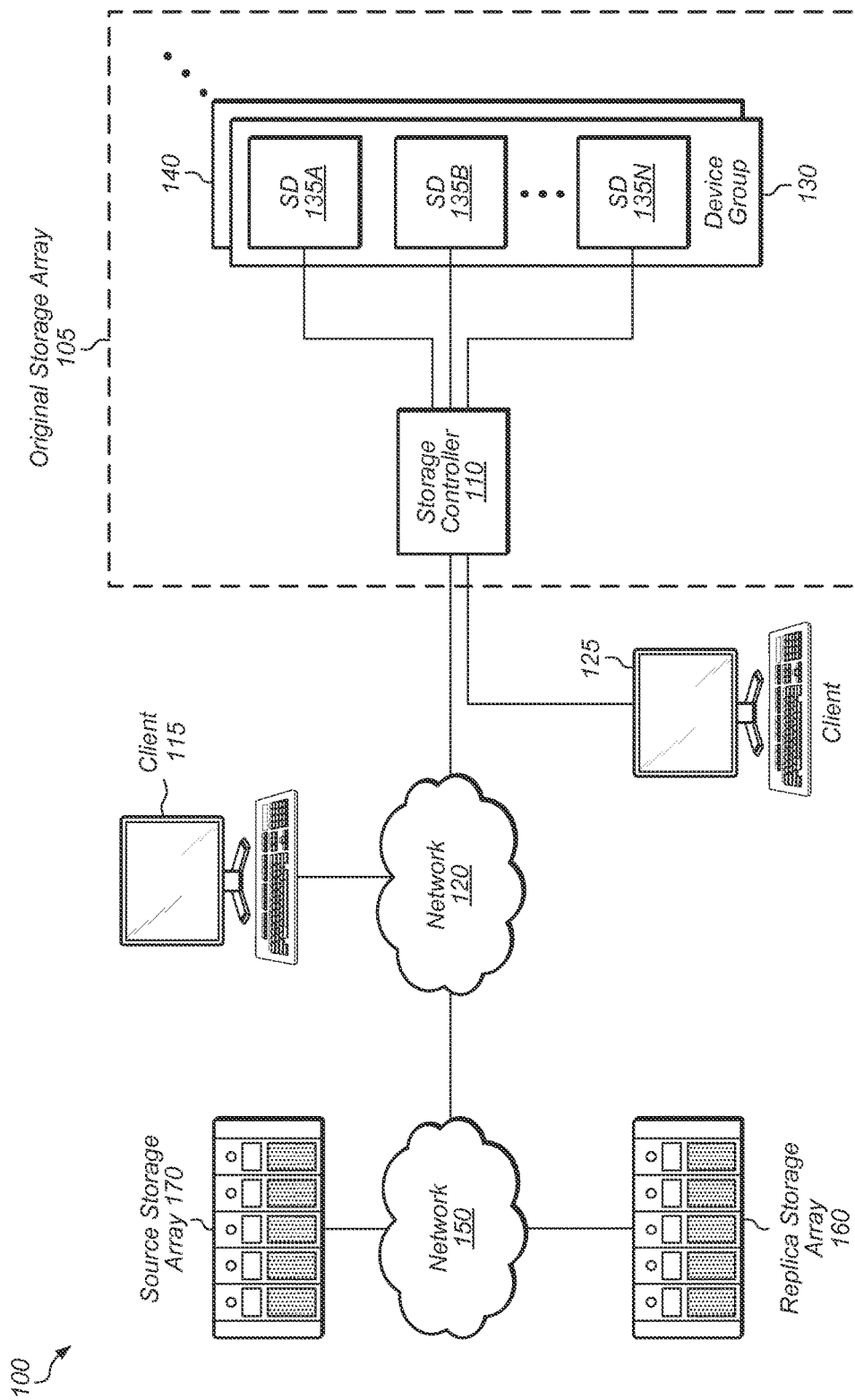
FIG. 1 is a generalized block diagram illustrating one embodiment of a storage system.

While the methods and mechanisms described herein are susceptible to various modifications and alternative forms, specific embodiments are shown by way of example in the drawings and are herein described in detail. It should be understood, however, that drawings and detailed description thereto are not intended to limit the methods and mechanisms to the particular form disclosed, but on the contrary, are intended to cover all modifications, equivalents and alternatives apparent to those skilled in the art once the disclosure is fully appreciated.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a storage controller . . . " Such a claim does not foreclose the system from including additional components (e.g., a network, a server, a display device).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a generalized block diagram of one embodiment of a storage system 100 is shown. Storage system 100 may include original storage array 105, replica storage array 160, and source storage array 170. Original storage array 105 may include storage controller 110 and storage device groups 130 and 140, which are representative of any number of storage device groups. As shown, storage device group 130 includes storage devices 135A-N, which are representative of any number and type of storage devices (e.g., solid-state drives (SSDs)). Although not shown in FIG. 1, replica storage array 160 and source storage array 170 may also include one or more storage controllers and one or more storage device groups. It should be understood that while storage system 100 is shown as including three storage arrays, in other embodiments, the number of storage arrays in storage system 100 may vary. For example, in another embodiment, original storage array 105 may be the only storage array in storage system 100. It is noted that storage arrays 105, 160, and 170 may also be referred to as storage subsystems or storage systems.

Storage controller 110 may be coupled directly to client computer system 125, and storage controller 110 may be coupled remotely over network 120 to client computer system 115. Clients 115 and 125 are representative of any number of clients which may utilize storage system 100 for storing and accessing data. It is noted that some systems may include only a single client, connected directly or remotely to storage controller 110. It is also noted that original storage array 105 may include more than one storage controller in some embodiments.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-N to prevent loss of data due to the failure of a device or the failure of storage locations within a device. Storage controller 110 may also utilize any of various deduplication techniques for reducing the amount of data stored in devices 135A-N.

Storage controller 110 may be configured to create and manage mediums in system 100. Accordingly, a set of mediums may be recorded and maintained by storage controller 110. The term "medium" as is used herein is defined as a logical grouping of data. A medium may have a corresponding identifier with which to identify the logical grouping of data. Each medium may also include or be associated with mappings of logical block numbers to content location, deduplication entries, and other information. In one embodiment, medium identifiers may be used by the storage controller but medium identifiers may not be user-visible. A user (or client) may send a data request accompanied by a volume ID to specify which data is targeted by the request, and the storage controller may map the volume ID to a medium ID and then use the medium ID when processing the request.

A medium may be virtual such that it is identified by a unique ID, and all blocks stored to a volume while the corresponding medium is open for writing may be recorded as <medium, block number>. Each medium logically comprises all of the blocks in the medium. However, only the blocks that were written to the medium from the time the medium was created to the time the medium was closed are recorded and mappings to these blocks may also be maintained with the medium.

The term "medium" is not to be confused with the terms "storage medium" or "computer readable storage medium". A storage medium is defined as an actual physical device (e.g., SSD, HDD) that is utilized to store data. A computer readable storage medium (or non-transitory computer readable storage medium) is defined as a physical storage medium configured to store program instructions which are executable by a processor or other hardware device. Various types of program instructions that implement the methods and/or mechanisms described herein may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, multiple mapping tables may be maintained by storage controller 110. These mapping tables may include a medium mapping table, a volume-to-medium mapping table, a medium history table, an address translation table, a deduplication table, an overlay table, and/or other tables. In some embodiments, the information stored in two or more of these tables may be combined into a single table. The medium mapping table may be utilized to record and maintain the mappings between mediums and underlying mediums and the volume-to-medium mapping table may be utilized to record and maintain the mappings between volumes and anchor mediums. In one embodiment, a volume may be mapped to an anchor medium which is in a read-write state. The anchor medium may then be mapped to any number of underlying mediums (or portions of mediums) in the medium mapping table. A sector or other portion of a medium may be referred to as "underlying" a volume if the sector or portion of the medium is included within the volume. In other words, a given sector of a medium may "underlie" a volume if the anchor medium of the volume maps to the given sector.

The address translation table may include a plurality of entries, with each entry holding a virtual-to-physical mapping for a corresponding data component. This mapping table may be used to map logical read/write requests from each of the client computer systems 115 and 125 to physical locations in storage devices 135A-N. A "physical" pointer value may be read from the mappings associated with a given medium or snapshot during a lookup operation corresponding to a received read/write request. This physical pointer value may then be used to locate a physical location within the storage devices 135A-N. It is noted that the physical pointer value may be used to access another mapping table within a given storage device of the storage devices 135A-N. Consequently, one or more levels of indirection may exist between the physical pointer value and a target storage location.

In various embodiments, the address translation table may be accessed using a key comprising a medium or snapshot ID, a logical or virtual address, a sector number, and so forth. A received read/write storage access request may identify a particular volume, sector, and length. The volume ID may be mapped to a medium or snapshot ID using the volume to medium mapping table. A sector may be a logical block of data stored in a medium, with a sector being the smallest size of an atomic I/O request to the storage system. In one embodiment, a sector may have a fixed size (e.g., 512 bytes) and the mapping tables may deal with ranges of sectors. For example, the address translation table may map a medium in sector-size units. The areas being mapped may be managed as ranges of sectors, with each range consisting of one or more consecutive sectors. In one embodiment, a range may be identified by <medium, start sector, length>, and this tuple may be recorded in the address translation table and medium mapping table. In one embodiment, the key value for accessing the address translation table may be the combination of the medium ID and the received sector number. A key is an entity in a mapping table that distinguishes one row of data from another row. In other embodiments, other types of address translation tables may be utilized.

In one embodiment, the address translation table may map mediums and block offsets to physical pointer values. Depending on the embodiment, a physical pointer value may be a physical address or a logical address which the storage device maps to a physical location within the device. In one embodiment, an index may be utilized to access the address translation table. The index may identify locations of mappings within the address translation table. The index may be queried with a key value generated from a medium ID and sector number, and the index may be searched for one or more entries which match, or otherwise correspond to, the key value. Information from a matching entry may then be used to locate and retrieve a mapping which identifies a storage location which is the target of a received read or write request. In one embodiment, a hit in the index provides a corresponding virtual page ID identifying a page within the storage devices of the storage system, with the page storing both the key value and a corresponding physical pointer value. The page may then be searched with the key value to find the physical pointer value.

The deduplication table may include information used to deduplicate data at a fine-grained level. The information stored in the deduplication table may include mappings between one or more calculated hash values for a given data component and a physical pointer to a physical location in one of the storage devices 135A-N holding the given data component. In addition, a length of the given data component and status information for a corresponding entry may be stored in the deduplication table. It is noted that in some embodiments, one or more levels of indirection may exist between the physical pointer value and the corresponding physical storage location. Accordingly, in these embodiments, the physical pointer may be used to access another mapping table within a given storage device of the storage devices 135A-N.

In various embodiments, storage controller 110 may be configured to perform background operations such as read optimization operations and garbage collection operations. Read optimization operations may create new address translation entries for upper level mediums to replace entries for lower level mediums in order to reduce the number of seeks for future lookups of the corresponding volumes. Generally speaking, read optimization operations make future lookups of volumes and mediums more efficient by simplifying the mappings of volumes and mediums.

Networks 120 and 150 may utilize a variety of techniques including wireless connection, direct local area network (LAN) connections, wide area network (WAN) connections such as the Internet, a router, storage area network, Ethernet, and others. Networks 120 and 150 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in networks 120 and 150. The networks 120 and 150 may interface with a set of communications protocols used for the Internet such as the Transmission Control Protocol (TCP) and the Internet Protocol (IP), or TCP/IP.

Client computer systems 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

It is noted that in alternative embodiments, the number and type of storage arrays, client computers, storage controllers, networks, storage device groups, and data storage devices is not limited to those shown in FIG. 1. At various times one or more clients may operate offline. In addition, during operation, individual client computer connection types may change as users connect, disconnect, and reconnect to system 100. Further, the systems and methods described herein may be applied to directly attached storage systems or network attached storage systems and may include a host operating system configured to perform one or more aspects of the described methods. Numerous such alternatives are possible and are contemplated.

Figure 2:
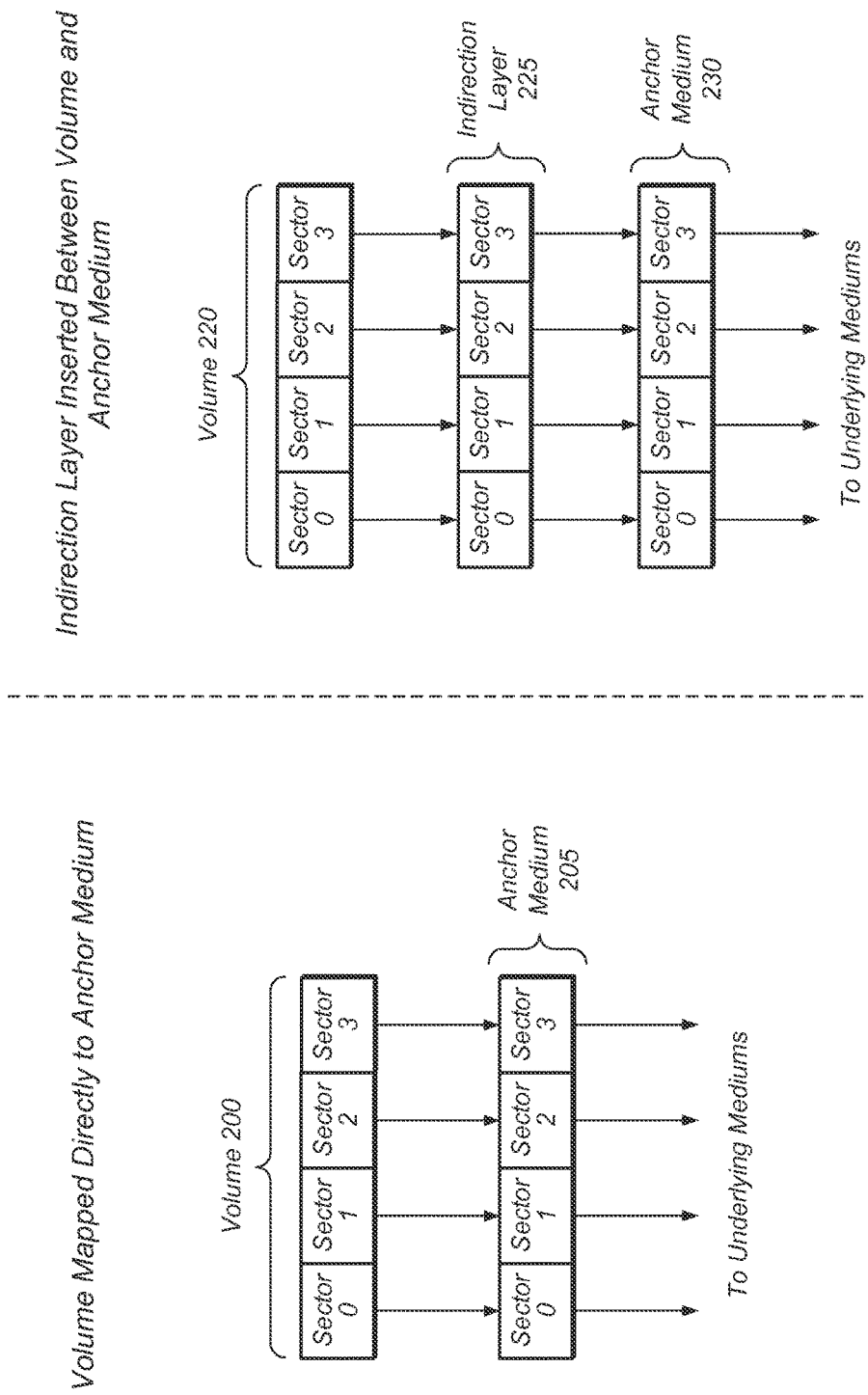
FIG. 2 is a logical block diagram illustrating two different underlying mapping structures of volumes.

Turning now to FIG. 2, a logical block diagram illustrating two different underlying mapping structures of volumes is shown. On the left side of FIG. 2 is a first approach for mapping a volume to its underlying mediums. As shown, volume 200 maps directly to anchor medium 205, which may be in a read-write state. Anchor medium 205 may then map to any number of levels of underlying mediums, with each of the underlying mediums in a read-only state. In other embodiments, volume 200 may map directly to multiple different anchor mediums.

On the right side of FIG. 2 is a second approach for mapping a volume to its underlying mediums. As shown, volume 220 maps directly to indirection layer 225. In some embodiments, indirection layer 225 is mutable and may be changed, while in others indirection layer 225 may be in a read-only state. Indirection layer 225 maps directly to anchor medium 230, which may be in a read-write state. Anchor medium 230 may then map to any number of levels of underlying mediums, with each of the underlying mediums in a read-only state. Indirection layer 225 may be a layer which does not receive writes but which writes may land in when a write is performed to volume 220, with the indirection layer 225 mapping volume 220 to its anchor medium 230. Operations like xcopy may modify indirection layer 225 to redirect reads and writes to other mediums. Writes may modify indirection layer 225 after encountering a read-only medium in order to allocate and point to a new medium. It is noted that the size of sectors 0-3 may vary depending on the embodiment. It is also noted that in other embodiments, volumes, indirection layers, and mediums may have other numbers of sectors besides four. It is further noted that in various embodiments the indirection layer 225 may map to multiple anchor mediums. Additionally the address space of volume 220 may be divided into a plurality of regions, with a different anchor medium corresponding to each region of volume 220.

The depiction of volume 220 illustrates the layers and mediums which underlie volume 220 and the mappings between these mediums. For example, anchor medium 230 underlies indirection layer 225, and any changes to volume 220 may be recorded in anchor medium 230. Each arrow shown from indirection layer 225 to anchor medium 230 indicates a mapping between indirection layer 225 and anchor medium 230, with an arrow indicating that a lookup of a given sector is mapped through anchor medium 230 (or through an underlying medium of anchor medium 230) rather than through indirection layer 225.

Although not shown in FIG. 2, it should be understood that volume 220 may have additional levels of underlying mediums below anchor medium 230. For example, in various embodiment, there may be one or more levels of mediums below anchor medium 230 in the medium hierarchy of volume 220. It is noted that the term "medium hierarchy" of a volume refers to all of the mediums which are referenced by the volume and which underlie the volume. The indirection layer of a given volume is at the top of the medium hierarchy followed by the current anchor medium of the given volume, while the oldest medium referenced by the given volume is at the bottom of the medium hierarchy. There may be any number of levels in the medium hierarchy between the anchor medium and the oldest medium, depending on the number of snapshots which have been taken of the given volume and on other factors such as medium consolidation or other volume-level operations, such as copy offload and clone.

By introducing indirection layer 225 between volume 220 and anchor medium 230, background operations may be performed more efficiently for volume 220. For example, certain types of operations (e.g., snapshots, extended copy operations) may be performed to volume 220 and may change the underlying mapping structure of volume 220. However, when read optimization operations are performed after these other operations, having indirection layer 225 directly below volume 220 in the medium hierarchy allows the read optimization operations to be run on only the portions of volume 220 which have changed rather than on the entire volume 220. Indirection layer 225 allows the storage controller to more easily track the changes which have been made to volume 220. For example, by allocating an indirection layer as the top level of a volume's medium hierarchy, the storage controller is able to break up the volume space into a plurality of small portions of volume space and perform sub-volume snapshots.

Figure 3:
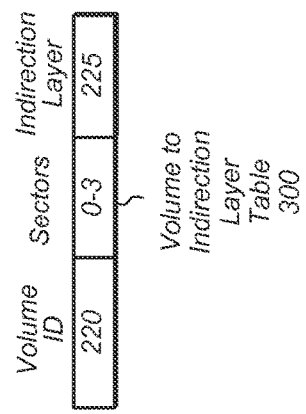
FIG. 3 illustrates volume mapping tables in accordance with one embodiment.
Figure 3:
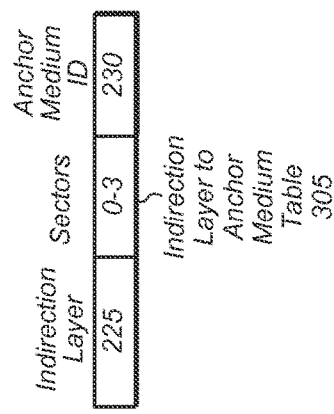

Referring now to FIG. 3, volume mapping tables in accordance with one embodiment are shown. Two tables are shown in FIG. 3 which may be used to record at least a portion of the mappings between volume 220 (of FIG. 2) and its underlying mapping layers. Volume to Indirection Layer Table 300 records volume 220 as being mapped to indirection layer 225 for sectors 0-3. Indirection Layer to Anchor Medium Table 305 records indirection layer 225 as being mapped to anchor medium 230 for sectors 0-3. In some embodiments, the entry shown in table 305 may be included within a medium mapping table (not shown) rather than being stored in a separate table. In one embodiment, the mappings between anchor medium 230 and its underlying mediums, although not shown in FIG. 3, may be stored within the medium mapping table.

Although tables 300 and 305 are shown as having only a single entry, these two tables may have any number of additional entries depending on the number of volumes in use in the storage system. It should be understood that tables 300 and 305 may be organized in a different manner and/or may include other information in other embodiments. It is also noted that any suitable data structure may be used to store the mapping table information of tables 300 and 305 (and of the medium mapping table) in order to provide for efficient searches (e.g., b-trees, binary trees, hash tables, etc.). All such data structures are contemplated. Further, tree balancing and other techniques known in the art may be used to improve the efficiency of searches.

Figure 4:
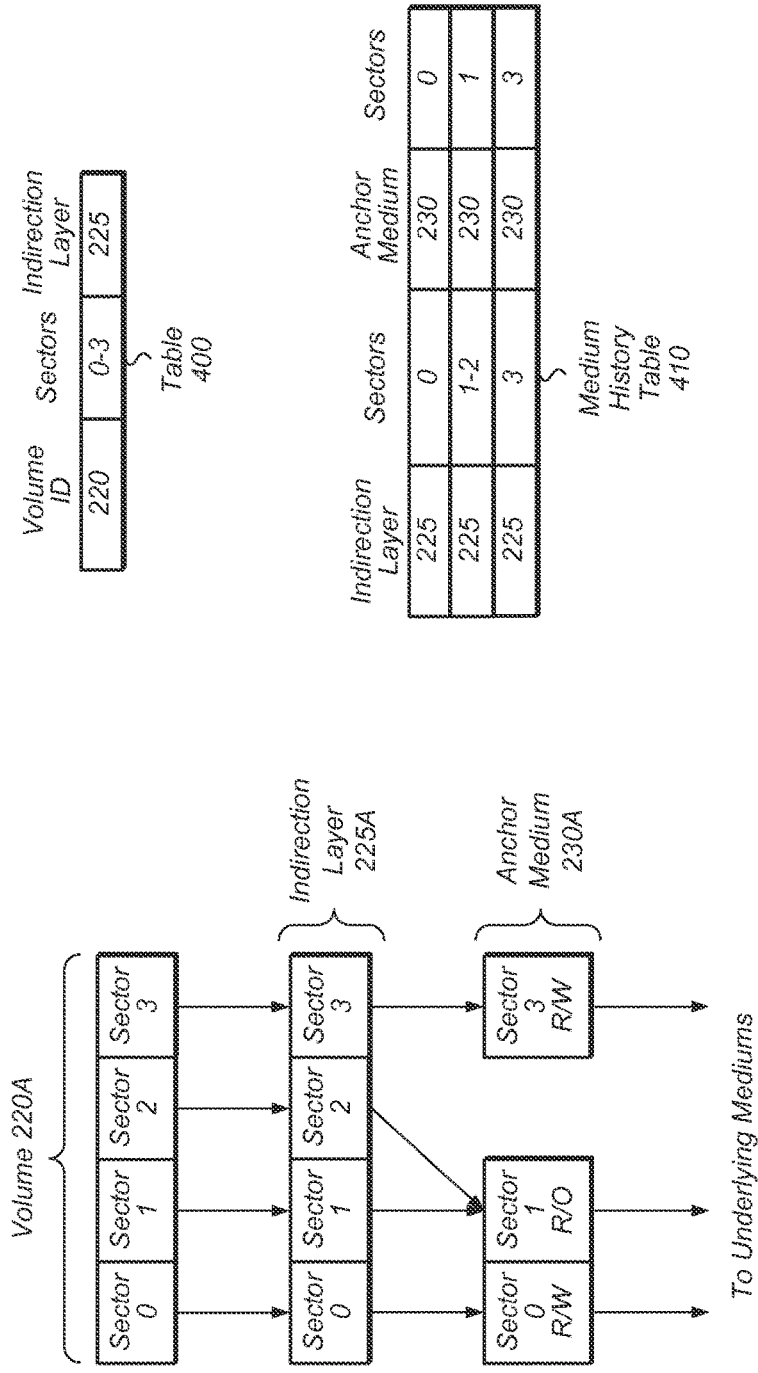
FIG. 4 is a logical block diagram illustrating one embodiment of a volume after an xcopy operation is performed.

Turning now to FIG. 4, a logical block diagram of a volume after an xcopy operation is performed is shown. The discussion of FIG. 4 is a continuation of the discussion regarding FIGS. 2-3. It may be assumed for the purposes of this discussion that an extended copy (or xcopy) operation has been performed to copy sector 1 to sector 2 of volume 220A. Accordingly, volume 220A, indirection layer 225A, and anchor medium 230A are intended to represent volume 220, indirection layer 225, and anchor medium 230 (of FIG. 2), respectively, at a later point in time, after the xcopy operation has been performed.

As a result of performing the xcopy operation of sector 1 to sector 2, sector 2 of indirection layer 225A may now point to sector 1 of anchor medium 230A, and sector 1 of anchor medium 230A may be put into the read-only state. This is recorded in table 410 with both sectors 1-2 of indirection layer 225 referencing sector 1 of medium 230A. Also, sector 2 in medium 230A may be marked as reclaimable. Rather than creating a new anchor medium for sector 1 of volume 220A, the storage controller may wait until a write operation targeting this sector is detected, and then at that point in time, the storage controller may create a new anchor medium in a read-write state for sector 1 of volume 220A. As shown in FIG. 4, table 400 includes an entry for volume 220A and table 405 includes entries for indirection layer 225A. These entries show the volume ID, indirection layer ID, and medium ID as numbers 220, 225, and 230 (respectively) without the suffix "A" for ease of illustration.

The read-write or read-only status of each sector of anchor medium 230A is shown in the block diagram on the left side of page 4. Since sectors 0 and 3 of anchor medium 230A were unaffected by the xcopy operation, these sectors may remain in the read-write state. Only sector 1 of anchor medium 230A may be converted into the read-only state as a result of the xcopy operation. The storage controller may delay the creation of a new anchor medium for this sector until a later point in time when a write operation targets this sector. Although not shown in FIG. 4, sector 2 of medium 230A may be marked, or otherwise identifiable, as reclaimable.

As part of the xcopy operation, read optimization may be performed on only the portions of anchor medium 230A which were converted into the read-only state. In this case, only sector 1 of anchor medium 230A was converted into the read-only state, so read optimization may only be performed on this sector. Since sectors 0 and 3 remain in the read-write state, read optimization may be prevented from being performed on these sectors. This allows the storage controller to prevent read optimization from being performed on the entire volume each time an xcopy operation is performed on only a portion of the volume.

Figure 5:
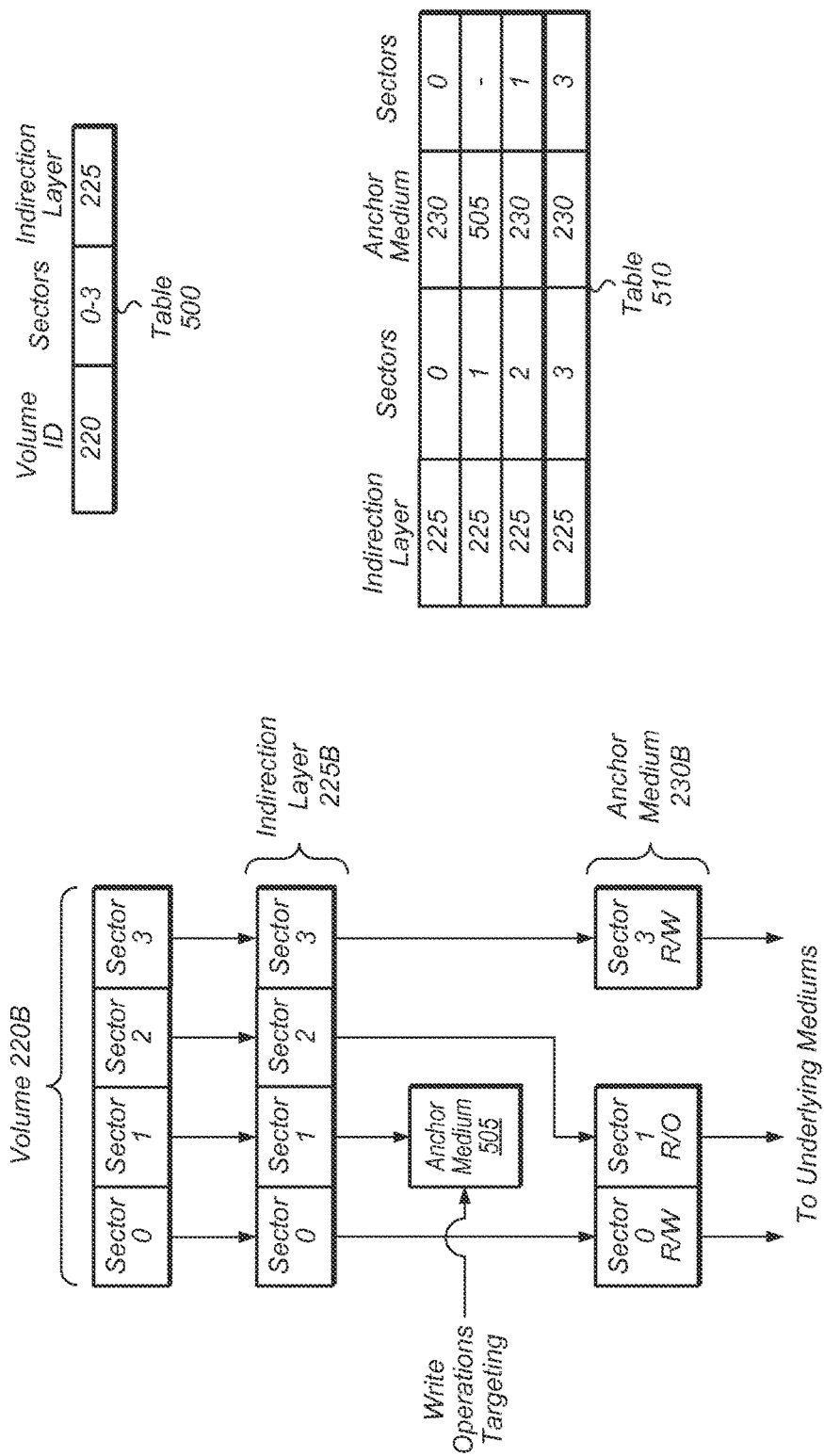
FIG. 5 is a logical block diagram of one embodiment of a volume after write operations targeting the volume are received.

Referring now to FIG. 5, a logical block diagram of another embodiment of a volume is shown. It may be assumed for the purposes of this discussion that write operations targeting sector 1 of volume 220B have been received by the storage system. Volume 220B, indirection layer 225B, and anchor medium 230B are intended to represent volume 220A, indirection layer 225A, and anchor medium 230A (of FIG. 4) respectively, at a later point in time.

In response to receiving these one or more write operations targeting sector 1 of volume 220B, the storage controller may be configured to create new anchor medium 505 and to perform the write operation(s) to anchor medium 505. Anchor medium 505 may be inserted into the medium hierarchy of volume 220B such that sector 1 of indirection layer 225B is mapped directly to anchor medium 505.

In one embodiment, the storage controller may try to make the size of the new anchor medium 505 as small as possible. For example, the storage controller may make the size of the new anchor medium 505 the same size as the size of the portion of volume 220B being targeted by the write operations. In this case, the size of the new anchor medium 505 may be the size of one sector. In various embodiments, the new anchor medium 505 may be larger than the size of the portion of volume 220B being targeted by the write operations. There are a number of factors that might be used to determine the size of the new anchor medium 505. Such factors may include a size of a write operation targeted to the new anchor medium, historical write patterns, a size of a data structure used to identify and or maintain medium mappings (e.g., graph size), fragmentation of the data structure, and/or other factors. For example, if detecting two overwrites sufficiently close together, the storage controller may allocate a single anchor medium covering both regions and then perform read optimization on the remaining sectors. If the write operations target locations of volume 220B which are not sector-aligned, the storage controller may make the size of the new anchor medium 505 as small as possible while keeping anchor medium 505 aligned with sector boundaries. In another embodiment, the storage controller may make the size of the new anchor medium 505 larger than the size of the portion of volume 220B being targeted by the write operations.

When new anchor medium 505 is allocated, it may be created such that it is smaller than anchor medium 230B since the write operations are targeting only a portion of volume 220B. Then, read optimization operations may be performed only on the corresponding sector (i.e., sector 1) of anchor medium 230B rather than on the entirety of anchor medium 230B. This helps ensure that read optimization operations are only performed on portions of volume 220B that are changing.

Although not shown in FIG. 5, additional write operations may be performed to volume 220B after the write operations targeting sector 1 of volume 220B are completed. If subsequent write operations target an adjacent sector (e.g., sector 0, sector 2) of volume 220B, then rather than creating a new anchor medium for these write operations, the writes can be coalesced into new anchor medium 505. The size of anchor medium 505 may then be increased to accommodate the writes to the adjacent sector.

Figure 6:
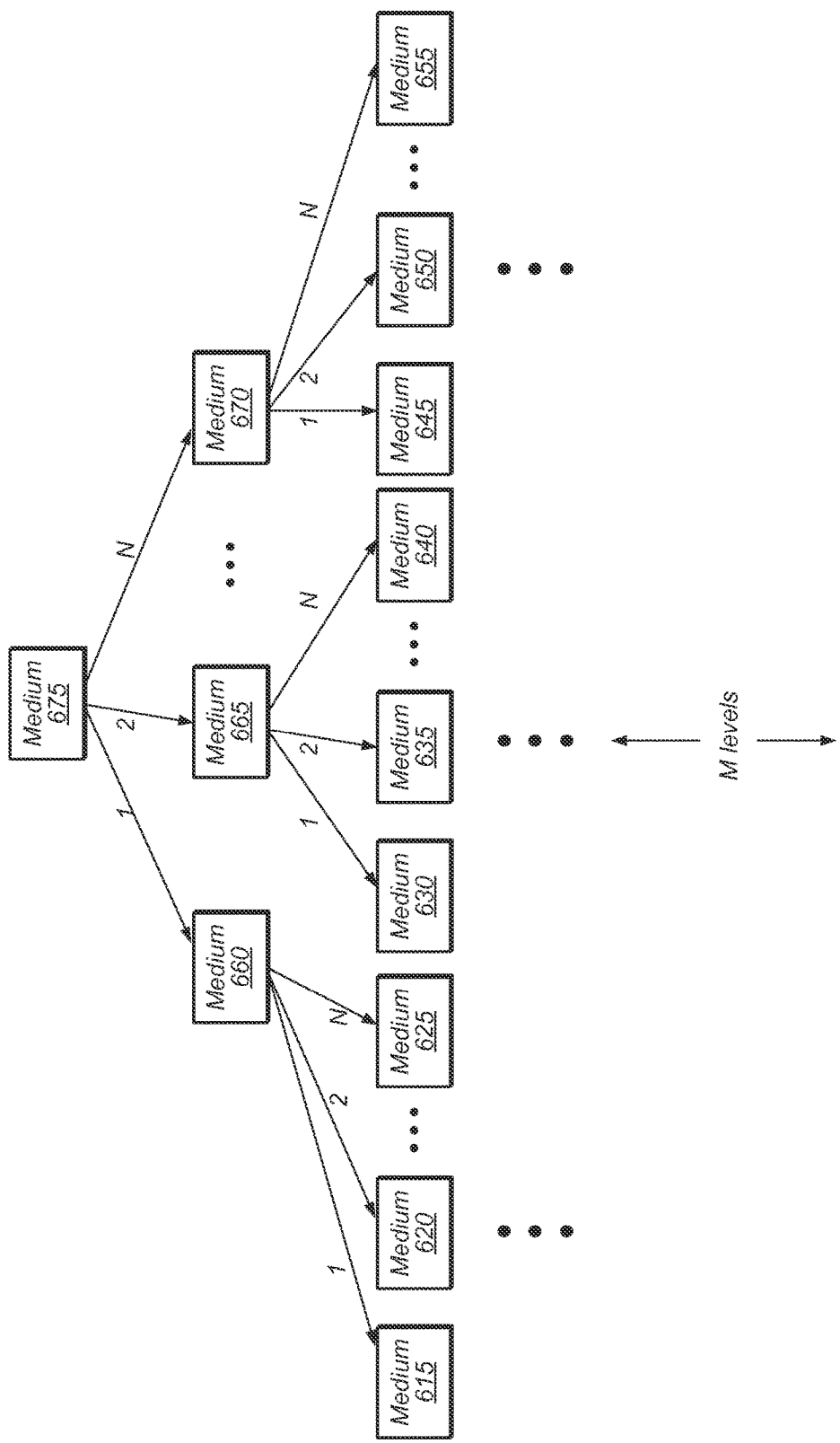
FIG. 6 is a logical block diagram of one embodiment of an n-ary medium tree graph.

Turning now to FIG. 6, a block diagram of a data structure. In this example, an n-ary medium tree graph is shown. However, other data structures are possible and are contemplated. In one embodiment, the storage system may be configured to limit the number of mediums which a given medium directly depends on to a number 'N', wherein 'N' is a positive integer. In various embodiments, N is programmable. Therefore, for each medium shown in the graph of FIG. 6, the medium may be allowed to have only 'N' directly dependent mediums. Also, the number of underlying levels in the medium hierarchy of any medium may be limited to a programmable number 'M', wherein 'M' is a positive integer. In some embodiments, 'N' may be equal to 'M', while in other embodiments, the values of 'N' and 'M' may differ. Additionally, in one embodiment, each medium may have a minimum size, wherein the minimum size may vary according to the embodiment. For example, in some embodiments, the minimum size of a medium may be a single sector.

As shown in FIG. 6, the highest medium in the n-ary medium tree graph is medium 675. Medium 675 may be directly mapped to 'N' different mediums, with mediums 660, 665, and 670 representing these 'N' mediums one level below medium 675. Additionally, each of these mediums may be directly dependent on up to 'N' mediums. Accordingly, medium 660 maps to mediums 615, 620, and 625, while medium 665 maps to mediums 630, 635, and 640, and medium 670 maps to mediums 645, 650, and 655. It is noted that the storage controller may be configured to limit the maximum number of mediums which a given medium depends on to 'N' mediums, but the given medium may be allowed to depend on less than 'N' mediums.

By walking up and down this n-ary medium tree, the storage controller may mark regions as being read-only at a variable granularity level, wherein the granularity level is based on the size of each medium, which may vary according to the embodiment. By maintaining the medium graph as an n-ary tree, the storage controller may enforce limitations on how tall and/or wide the graph can get, which limits the maximum number of seeks that will be performed for a given read operation. Another advantage of maintaining the medium graph as an n-ary tree is that this may limit the size that the medium mapping table and/or one or more other mapping tables may grow to.

It is noted that each node in the medium graph tree may be limited to having 'N' leaves and/or may be limited to having 'M' levels of mediums below it in the medium graph tree. In one embodiment, if the storage controller determines that a given medium has reached its limit of 'M' levels of mediums below it, then the storage controller may be configured to reduce these levels of mediums to which the given medium maps by promoting mappings higher up in the chain, performing read optimization operations, and/or remapping portions of the given medium. Also, in another embodiment, if the number of mediums which are directly mapped from the given medium reaches the limit of 'N' leaves, then the storage controller may be configured to create a snapshot to consolidate all of those 'N' leaves into a new medium which can replace the given medium. It is noted that this snapshot may be initiated independently by the storage controller rather than being initiated by a user operation or in response to the detection of a user operation.

In another embodiment, the storage controller may monitor the size of the medium mapping table, and if the size of the medium mapping table exceeds a given threshold, the storage controller may be configured to reduce the number 'N' and/or the number 'M'. The storage controller may attempt to keep the medium mapping table stored in a cache or other memory device with low latency, and if the size of the medium mapping table exceeds the size of the cache or other memory device, the storage controller may end up storing the medium mapping table in one or more slower memory devices. This may impair the performance of the storage system by increasing the amount of time required for lookups of the medium mapping table, thereby increasing the latency of read and write operations to the storage system. Therefore, the storage controller may attempt to avoid this scenario by limiting the size of the medium mapping table. Techniques for limiting the size of the medium mapping table may include reducing the number 'N' and/or the number 'M' to reduce the size of the n-ary medium graph tree. It is noted that a volume indirection layer may also be represented as an N-ary graph and may also be similarly optimized as described for the medium tree graph.

Figure 7:
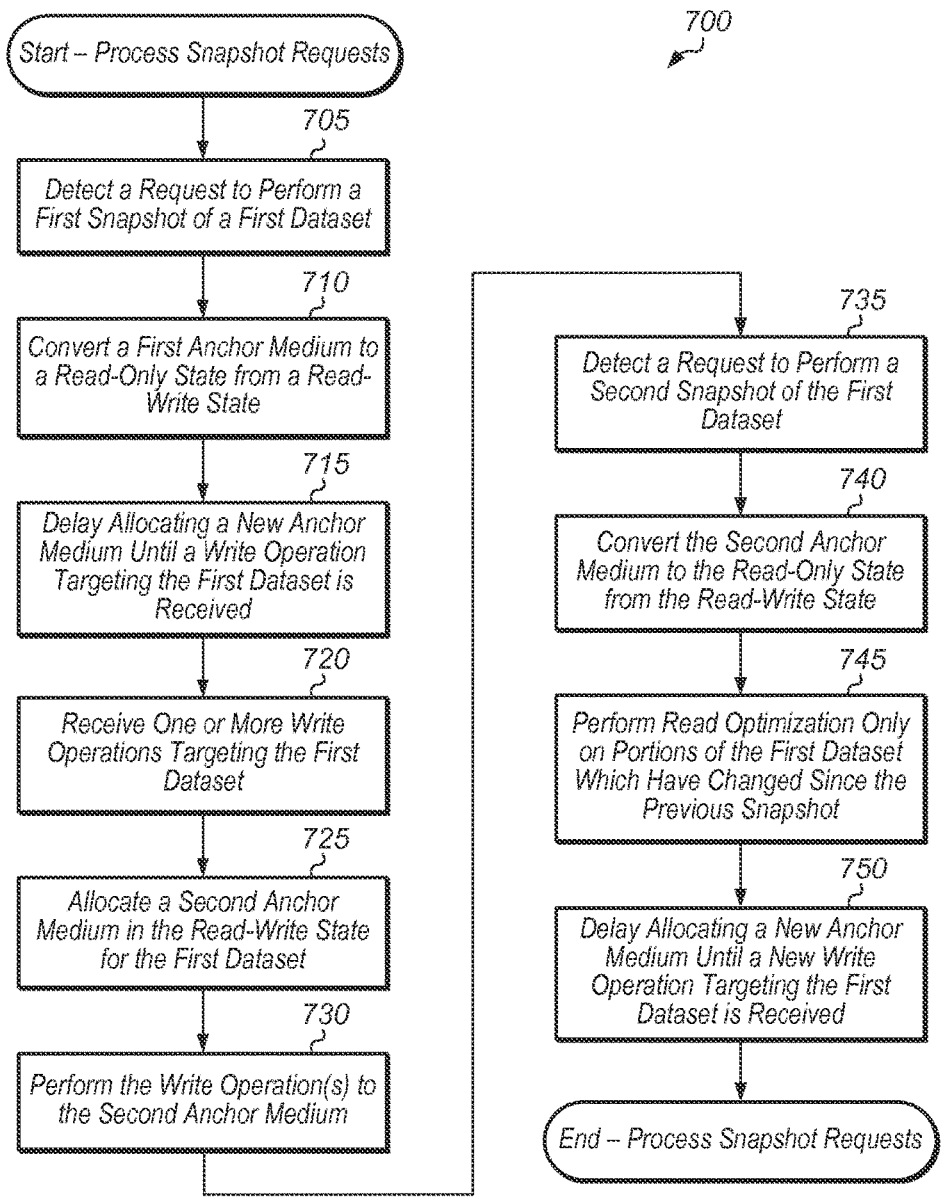
FIG. 7 is a generalized flow diagram illustrating one embodiment of a method for processing requests to perform snapshots.

Referring now to FIG. 7, one embodiment of a method 700 for processing snapshot requests is shown. The components embodied in system 100 described above (e.g., storage controller 110) may generally operate in accordance with method 700. In addition, the steps in this embodiment are shown in sequential order. However, some steps may occur in a different order than shown, some steps may be performed concurrently, some steps may be combined with other steps, and some steps may be absent in another embodiment.

A request to perform a first snapshot of a first dataset may be detected (block 705). In one embodiment, the first dataset may be a volume. In other embodiments, the first dataset may be other types of data entities. In response to detecting the request to perform the first snapshot of the first dataset, a first anchor medium, which underlies the first dataset, may be converted to a read-only state from a read-write state (block 710). Also in response to detecting the request to perform the first snapshot of the first dataset, the storage controller may delay allocating a new anchor medium for the first dataset until a write operation targeting the first dataset is received (block 715).

Next, the storage controller may receive one or more write operations targeting the first dataset (block 720). In response to receiving the write operation(s), the storage controller may allocate a second anchor medium for the first dataset, wherein the second anchor medium is allocated in the read-write state (block 725). In some embodiments, the size of the second anchor medium may be equal to the size of the portion of the first dataset which is targeted by the received write operation(s). In other embodiments, the size of the second anchor medium may be extended so that it is aligned to sector boundaries. The second anchor medium may be placed within the medium hierarchy of the first dataset such that it directly underlies an indirection layer of the first dataset and directly maps to the first anchor medium. Next, the storage controller may perform the write operation(s) to the second anchor medium (block 730).

Then, at a later point in time, a request to perform a second snapshot of the first dataset may be detected (block 735). In response to detecting the request to perform the second snapshot of the first dataset, the second anchor medium may be converted into the read-only state (block 740). Also in response to detecting the request to perform the second snapshot of the first dataset, the storage controller may be configured to perform read optimization only on those portions of the first dataset which have changed since the previous snapshot (block 745). In this case, the portions of the first dataset which have changed since the previous snapshot correspond to the second anchor medium. Also in response to detecting the request to perform the second snapshot of the first dataset, the storage controller may be configured to delay allocating a new anchor medium for the first dataset until a new write operation targeting the first dataset is received (block 750). After block 750, method 700 may end. It is noted the steps of method 700 may be used when processing any number of snapshots for each dataset of a plurality of datasets over any amount of time.

Figure 8:
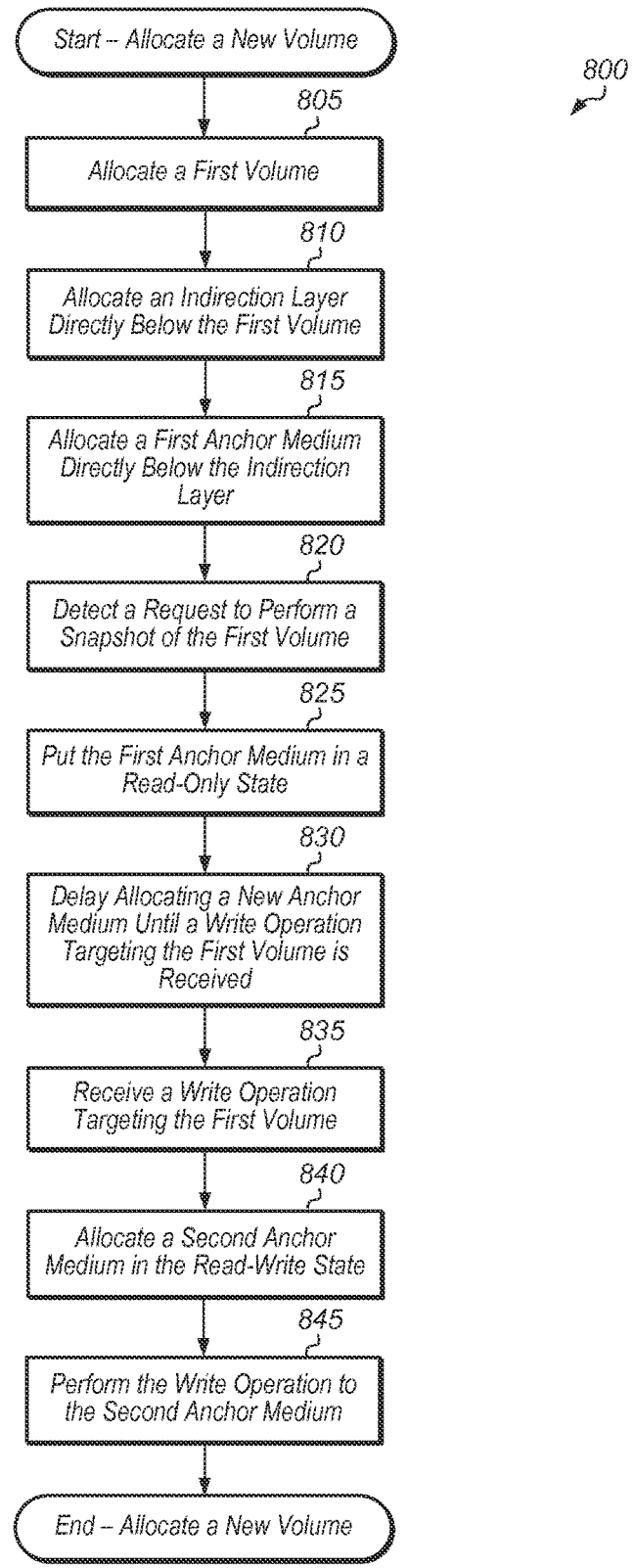
FIG. 8 is a generalized flow diagram illustrating one embodiment of a method for allocating a new volume.

Turning now to FIG. 8, one embodiment of a method 800 for allocating a new volume is shown. The components embodied in system 100 described above (e.g., storage controller 110) may generally operate in accordance with method 800. In addition, the steps in this embodiment are shown in sequential order. However, some steps may occur in a different order than shown, some steps may be performed concurrently, some steps may be combined with other steps, and some steps may be absent in another embodiment.

A first volume may be allocated by a storage controller (block 805). In one embodiment, the first volume may be allocated in response to a user request to create a new volume. Next, the storage controller may allocate (or "create") an indirection layer directly below the first volume (block 810). The indirection layer may be in a read-only state, and the indirection layer may be used to map the first volume to the other mediums of the first volume's medium hierarchy. Also, the storage controller may allocate a first anchor medium directly below the indirection layer, and the first anchor medium may be put in a read-write state (block 815).

At a later point in time, a request to perform a snapshot of the first volume may be detected (block 820). In response to the request, the first anchor medium may be put in the read-only state (block 825). Also in response to the request, the storage controller may delay allocating a new anchor medium until a write operation targeting the first volume is received (block 830). When a write operation targeting the first volume is received (block 835), then a second anchor medium may be allocated in the read-write state (block 840). The second anchor medium may be placed in between the indirection layer and the first anchor medium in the first volume's medium hierarchy, such that the second anchor medium is directly underneath the indirection layer and directly above the first anchor medium. Then, the write operation may be performed to the second anchor medium (block 845). After block 845, method 800 may end.

Figure 9:
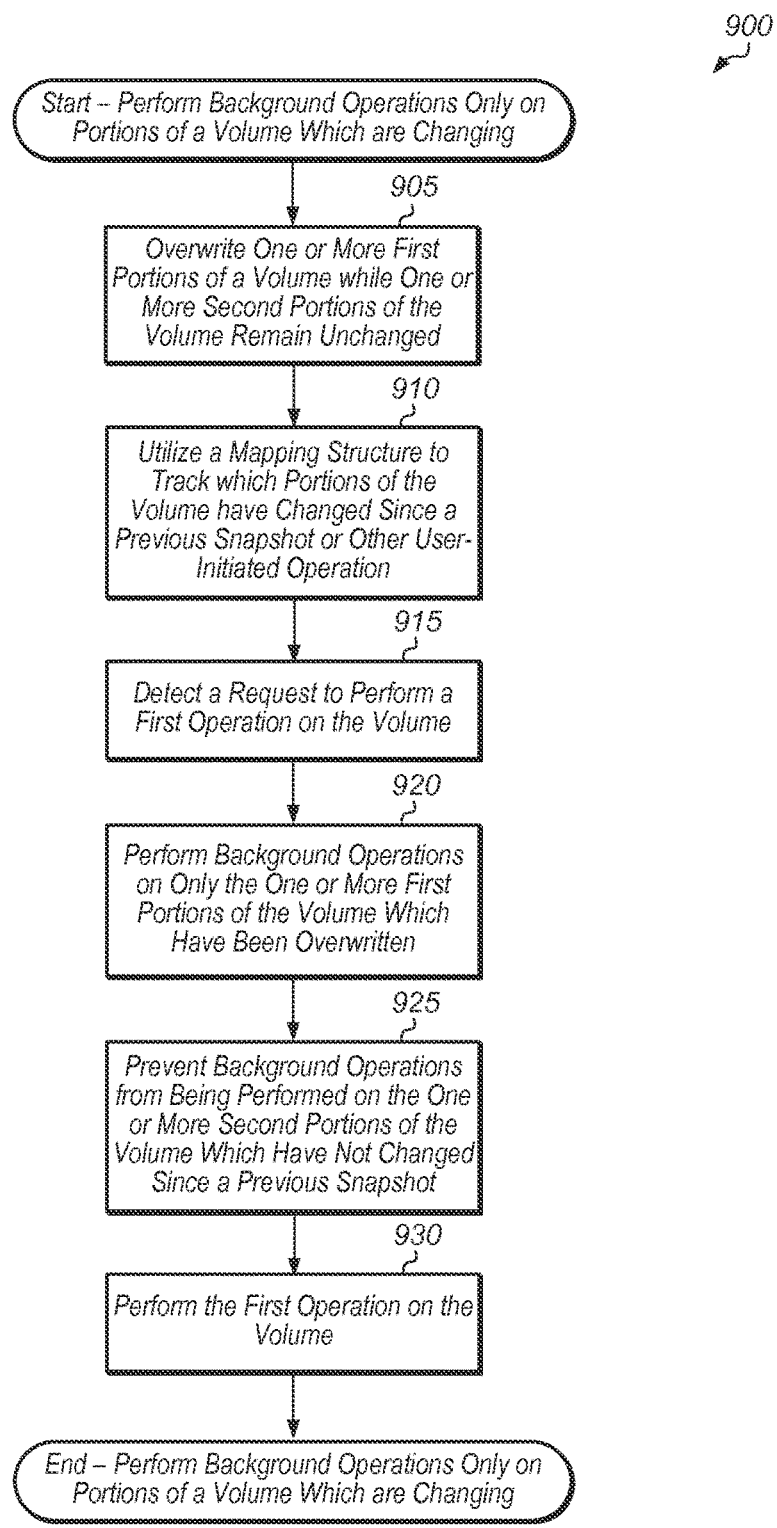
FIG. 9 is a generalized flow diagram illustrating one embodiment of a method for performing background operations only on those portions of a volume which are changing.

Referring now to FIG. 9, one embodiment of a method 900 for performing background operations only on those portions of a volume which are changing is shown. The components embodied in system 100 described above (e.g., storage controller 110) may generally operate in accordance with method 900. In addition, the steps in this embodiment are shown in sequential order. However, some steps may occur in a different order than shown, some steps may be performed concurrently, some steps may be combined with other steps, and some steps may be absent in another embodiment.

A storage controller may overwrite one or more first portions of a volume over a period of time while processing one or more write operations, wherein one or more second portions of the volume remain unchanged (block 905). The storage controller may utilize a mapping structure to track which portions of the volume have changed since a previous snapshot or other user-initiated operation (block 910). In one embodiment, the mapping structure may include an indirection layer beneath the volume for partitioning the address space of the volume into portions which have been overwritten and portions which have remained unchanged. In other embodiments, other types of mapping structures (e.g., mapping tables, tuples) may be used to track the portions of the volume which have changed.

Next, a request to perform a first operation (e.g., snapshot, xcopy operation) on the volume may be detected (block 915). In response to the request to perform the first operation, the storage controller may perform background operations (e.g., read optimization operations, garbage collection operations) on only the one or more first portions of the volume which have been overwritten (block 920). Also in response to the request, the storage controller may prevent background operations from being performed on the one or more second portions of the volume which have not changed since the most recent snapshot (block 925). Also in response to the request, the storage controller may perform the first operation on the volume (block 930). After block 930, method 900 may end.

Figure 10:
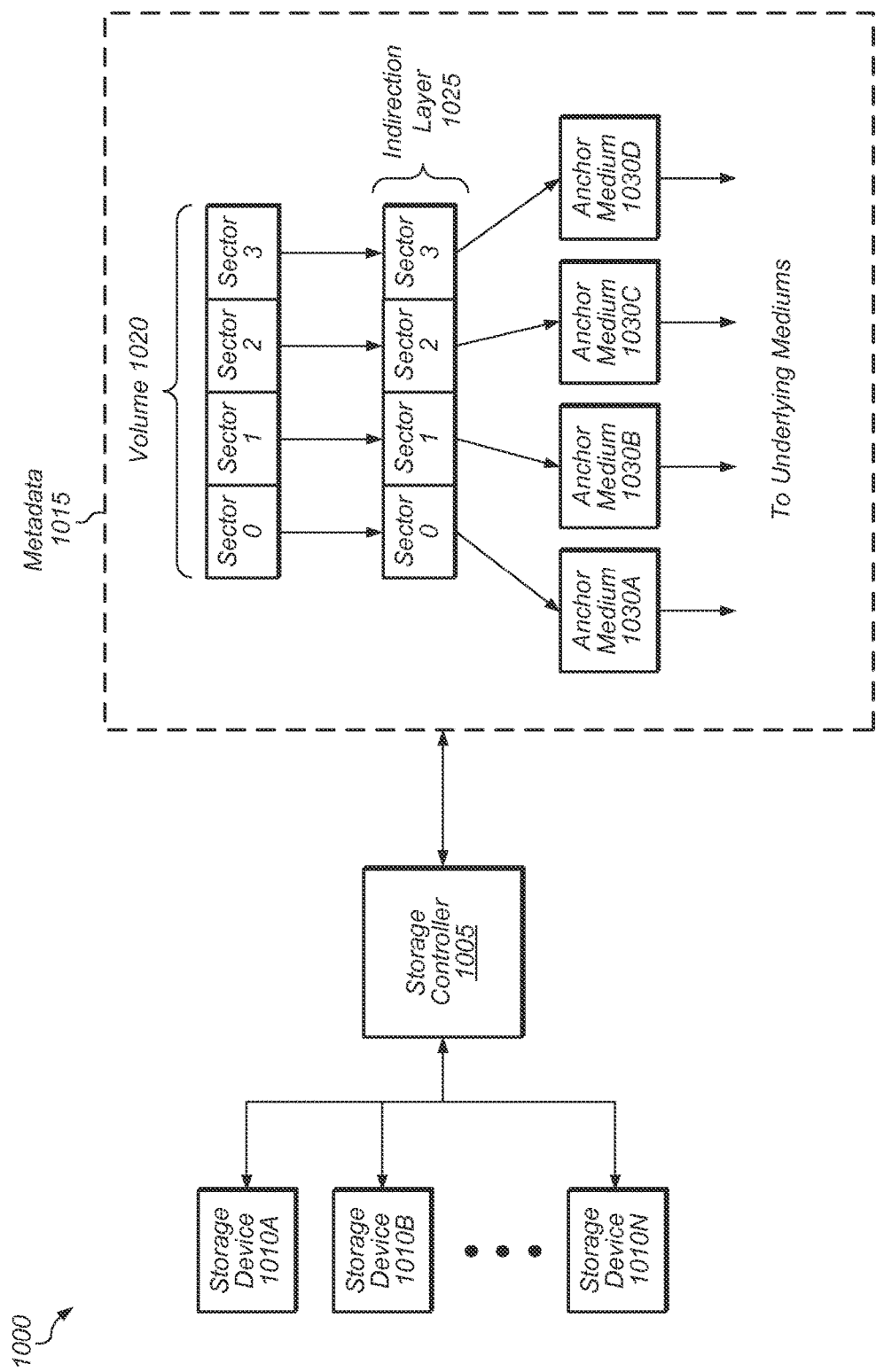
FIG. 10 is a block diagram of one embodiment of a system including a storage controller coupled to a plurality of storage devices.

Turning now to FIG. 10, one embodiment of a system 1000 including a storage controller 1005 coupled to a plurality of storage devices 1010A-N corresponding to the above description is shown. In various embodiments, storage controller 1005 may be configured to maintain metadata 1015 that includes volume and indirection layer mappings to anchor mediums and other underlying mediums. It is noted that metadata 1015 may include mappings for any number of volumes, and metadata 1015 may include other types of metadata and mapping tables not shown in FIG. 10.

In one embodiment, storage controller 1005 may be configured to create indirection layer 1025 for volume 1020, with indirection layer 1025 mapped directly below volume 1020. Indirection layer 1025 may, in turn, map to one or more anchor mediums 1030A-1030D. Additionally, indirection layer 1025 may be in a read-only state. Read and write operations targeting volume 1020 may be mapped to anchor media using indirection layer 1025. Further, in response to detecting a request to perform a first snapshot of volume 1020, storage controller 1005 may be configured to convert anchor mediums 1030A-D to a read-only state. In some embodiments, storage controller 1005 may also be configured to delay creation of a new anchor medium(s) until a write operation targeting volume 1020 is received. When storage controller 1005 receives a write operation targeting volume 1020, storage controller 1005 may create a new anchor medium in a read-write state which is mapped directly below indirection layer 1025. Storage controller 1005 may then perform the write operation to the new anchor medium.

In the example shown, volume 1020 includes four sectors which are mapped to indirection layer 1025. It is noted that volume 1020 may include any number of sectors depending on the embodiment. In one embodiment, each sector of indirection layer 1025 may be mapped to a different anchor medium. For example, sector 0 may be mapped to anchor medium 1030A, sector 1 may be mapped to anchor medium 1030B, sector 2 may be mapped to anchor medium 1030C, and sector 3 may be mapped to anchor medium 1030D. Generally speaking, indirection layer 1025 may map to any number of anchor mediums, depending on the pattern of overwrites, xcopy operations, and other operations which have been performed to volume 1020. Each anchor medium 1030A-D may also be mapped to any number of underlying mediums (not shown).

In one embodiment, at least a portion of metadata 1015 may be stored in one or more of storage devices 1010A-N. In another embodiment, at least a portion of metadata 1015 may be stored in one or more other storage devices (not shown), such as a non-volatile random-access memory (NVRAM). In a further embodiment, at least a portion of metadata 1015 may be stored in memory located in storage controller 1005. Other locations for storing metadata 1015 are possible and are contemplated.

Figure 11:
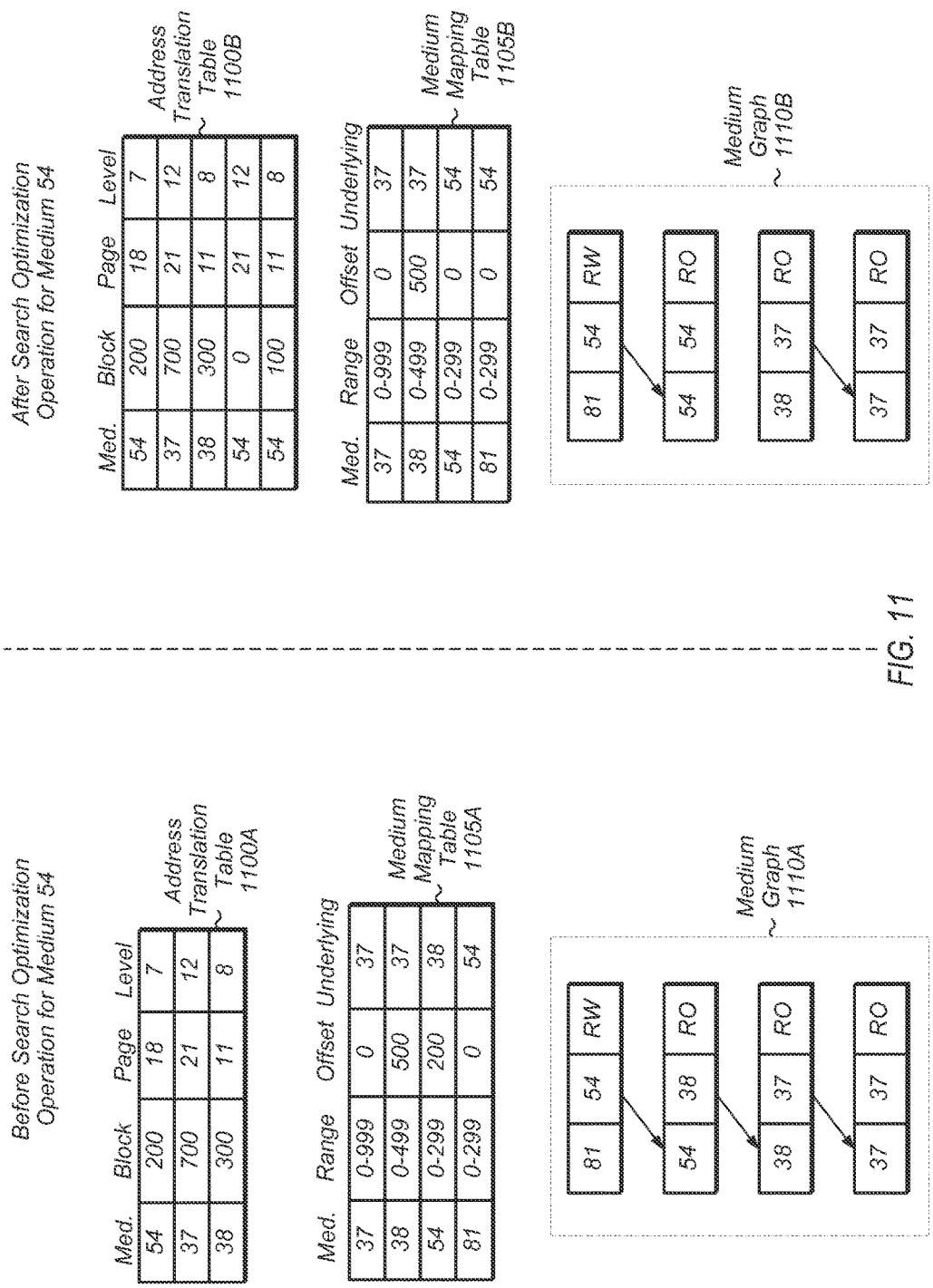
FIG. 11 is a block diagram illustrating one embodiment of a search optimization operation.

Referring now to FIG. 11, one embodiment of a search optimization operation is shown. Rather than performing the search optimization operation on anchor medium 81, which would cause the anchor medium 81 to be unavailable for user operations such as snapshots and xcopy operations, a search optimization operation may be performed on the underlying medium of anchor medium 81, which in this case is medium 54. The search optimization operation may be performed to collapse medium 54 into a medium that points to itself (i.e., has no underlying medium). This will ensure that future lookups to anchor medium 81 are more efficient by only having to perform lookups to at most two mediums. As part of the search optimization operation, address translation table entries may be consolidated for medium 54, resulting in all of the blocks of medium 54 being mapped directly from medium 54 rather than from a lower level medium as was previously the case. It is noted that while the search optimization operation is performed for medium 54, the user may still be able to perform a snapshot or xcopy operation to anchor medium 81. It is noted that search optimization operations may also be referred to as read optimization operations.

The left-side of FIG. 11 shows the status of anchor medium 81 and medium 54 prior to the search optimization operation being performed. As shown in medium mapping table 1105A, anchor medium 81 references medium 54, medium 54 has a range of 0-299 and an underlying medium of 38, and an offset of 200 is applied to blocks when going down to medium 38 from medium 54. It is noted that only the entries of the medium mapping table relevant to anchor medium 81 (and its underlying mediums) are shown in table 1105A, and the entries show only pertinent attributes to avoid cluttering the figure. Medium graph 1110A illustrates the relationships between the mediums prior to the search optimization operation taking place. As can be seen from medium graph 1110A, anchor medium 81 points to medium 54, medium 54 points to medium 38, and medium 38 points to medium 37. It is noted that in other embodiments, there may be several other mediums below medium 37 in the medium graph.

Also on the left-side of FIG. 11 is address translation table 1100A. Table 1100A shows only index entries associated with anchor medium 81 and its underlying mediums. These entries may actually be scattered throughout the overall address translation table but are shown as being adjacent entries in table 1100A merely for ease of illustration. It is also noted that there may be other levels of indirection in the overall address translation table that convert a medium and block number to a corresponding storage location, but these other levels are not shown to avoid cluttering the figure. The index entries shown in table 1100A represent all of the index entries in the address translation table associated with anchor medium 81. While each entry in table 1100A corresponds to a range size of 100 blocks, it is noted that in other embodiments, entries may correspond to other range sizes of other numbers of blocks.

It may be assumed for the purposes of this discussion that the storage controller performed a search to locate all index entries associated with anchor medium 81, and the index entries shown in table 1100A represent the result of this search. In the example of FIG. 11, there are no index entries assigned to anchor medium 81, which means nothing has been written to anchor medium 81 since it was created, and all blocks are mapped through mediums which underlie anchor medium 81. Therefore, the storage controller would search for index entries corresponding to the underlying medium of medium 81, which in this case is medium 54. However, for block 0 of medium 54, there is not an index entry assigned to medium 54. Therefore, the controller would search for index entries corresponding to the underlying medium of medium 54, which in this case is medium 38. Since medium 54 maps to medium 38 with an offset of 200, block 0 of medium 54 translates to block 200 of medium 38, and so the storage controller would perform a search for block 200 of medium 38. It is assumed that this lookup also resulted in a miss, in which case the storage controller would search the underlying medium of 38, which in this case is medium 37. Since medium 38 maps to medium 37 with an offset of 500, block 200 of medium 38 translates to block 700 of medium 37. In this case, a lookup for block 700 of medium 37 results in a hit, and the entry corresponding to block 700 of medium 37 is shown in table 1100A.

A search for block 100 of medium 81 would eventually locate the entry for block 300 of medium 38, and accordingly, an entry corresponding to block 300 of medium 38 is shown in table 500A. A search for block 200 of medium 81 would locate an entry assigned to medium 54, and therefore, an entry corresponding to block 200 of medium 54 is shown in table 1100A. It will be assumed for the purposes of this discussion that the three entries shown in table 1100A cover the entire address space of anchor medium 81. It should be understood that some mediums may have large numbers of address translation entries and that the example of anchor medium 81 having only three corresponding entries is used solely for illustrative purposes.

A storage controller may perform a search optimization operation for medium 54, and the results of this operation are shown on the right-side of FIG. 11. The first three entries of address translation table 1100B are the same as the entries of table 1100A. The entries assigned to medium 38 and medium 37 may be reclaimed by the storage controller if these blocks of medium 38 and medium 37 are no longer reachable (by upper-level mediums or by user volumes). However, these entries may remain in table 1100B for a period of time prior to being reclaimed.

Two new entries have been added to table 1100B as part of the search optimization operation, and these two entries are assigned to medium 54. These two new entries correspond to blocks 0 and 100 of medium 54, and attributes (e.g., page, level) may be copied from the corresponding existing entries and stored in the new entries. After the search optimization operation for medium 54 is performed, a lookup of table 1100B for any block of medium 54 will result in a hit for this lookup. Therefore, future lookups of anchor medium 81 and medium 54 will become more efficient. It is noted that other levels of address translation table 1100B may also be updated as part of the search optimization operation for medium 54, but these updates are not shown in FIG. 11 to avoid cluttering the figure.

Medium mapping table 1105B shows an updated entry for medium 54, which now points to itself as its own underlying medium. This is the case because a lookup of address translation table 1100B for medium 54 will always result in a hit for any blocks of medium 54. Medium graph 1110B also illustrates the new relationships between mediums after the search optimization operation, with medium 54 being its own underlying medium, with medium 81 still pointing to medium 54, and with medium 38 still pointing to medium 37.

Although not shown in FIG. 11, medium 54 may be the underlying medium of one or more other mediums. Any other upper-level mediums that have medium 54 as their underlying medium may benefit from more efficient lookups after the search optimization operation is performed since they will have fewer underlying mediums to traverse now that medium 54 has been consolidated. In addition, medium 81 may be converted into a quiesced medium since lookups for medium 81 will only have to search at most two mediums.

It is noted that in some embodiments, address translation tables 1100A and 1100B may have multiple levels of indirection and in these embodiments, each level of indirection which is accessed using a key generated from the medium ID and block number may be updated as part of the search optimization operation.

Although the example shown in FIG. 11 includes a small number of table entries and only three levels of underlying mediums beneath medium 81, in actual scenarios encountered by operational storage systems, the number of table entries and levels of underlying mediums may be substantially larger. In these embodiments, higher performance and efficiency gains can be attained by performing search optimization operations.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
one or more storage devices; and
a storage controller coupled to the one or more storage devices, wherein the storage controller is configured to:
allocate an indirection layer for a volume, wherein the indirection layer is mapped directly below the volume and above a first anchor medium, wherein the first anchor medium is a logical grouping of data; wherein the indirection layer is a link between the volume and the first anchor medium of the volume;
map read and write operations targeting the volume through the indirection layer;
in response to detecting a request to perform a first snapshot of the volume, convert a first anchor medium from a read-write state to a read-only state;
in response to detecting a write operation targeting the volume and subsequent to detecting the request to perform the first snapshot of the volume, allocate a second anchor medium that maps directly below the indirection layer and above the first anchor medium; and
perform the write operation to the second anchor medium.

2. The system as recited in claim 1, wherein a size of the second anchor medium is based at least in part on one or more of a size of a write operation targeted to the second anchor medium, a historical write pattern, a size of a data structure used to identify and/or maintain medium mappings, and fragmentation of the data structure.

3. The system as recited in claim 2, wherein responsive to detecting that a number of levels in a medium hierarchy of the volume has exceeded a threshold, the storage controller is configured to perform read optimization operations on the volume to reduce the number of levels in the medium hierarchy of the volume, and wherein responsive to determining a size of a medium mapping table has exceeded a given threshold, the storage controller is configured to reduce the threshold for the number of levels in the medium hierarchy of the volume.

4. The system as recited in claim 1, wherein responsive to detecting a request to perform a second snapshot of the volume, the storage controller is configured to:
perform read optimization operations on the second anchor medium; and prevent read optimization operations from being performed on portions of the volume corresponding to the first anchor medium.

5. The system as recited in claim 1, wherein the storage controller is further configured to:
  detect a request to copy at least a first portion of the volume as part of a first extended copy operation;
  convert a first portion of a first anchor medium corresponding to the first portion of the volume to a read-only state, responsive to detecting the request to perform the first extended copy operation; and
  delay allocation of a second anchor medium until a write operation targeting the first portion of the volume is received.

6. A method comprising:
  allocating an indirection layer for a volume, wherein the indirection layer is mapped directly below the volume and above a first anchor medium, wherein the first anchor medium is a logical grouping of data; wherein the indirection layer is a link between the volume and the first anchor medium of the volume;
  mapping read and write operations targeting the volume through the indirection layer;
  in response to detecting a request to perform a first snapshot of the volume, converting a first anchor medium from a read-write state to a read-only state;
  in response to detecting a write operation targeting the volume and subsequent to detecting the request to perform the first snapshot of the volume, allocating a second anchor medium that maps directly below the indirection layer and above the first anchor medium; and
  performing the write operation to the second anchor medium.

7. The method as recited in claim 6, wherein a size of the second anchor medium is based at least in part on one or more of a size of a write operation targeted to the second anchor medium, a historical write pattern, a size of a data structure used to identify and/or maintain medium mappings, and fragmentation of the data structure.

8. The method as recited in claim 7, wherein responsive to detecting that a number of levels in a medium hierarchy of the volume has exceeded a threshold, the method further comprising performing read optimization operations on the volume to reduce the number of levels in the medium hierarchy of the volume, and wherein responsive to determining a size of a medium mapping table has exceeded a given threshold, the method further comprising reducing the threshold for the number of levels in the medium hierarchy of the volume.

9. The method as recited in claim 6, further comprising:
  performing read optimization operations only on the second anchor medium; and
  preventing read optimization operation from being performed on portions of the volume corresponding to the first anchor medium.

10. The method as recited in claim 6, further comprising:
  detecting a request to copy at least a first portion of the volume as part of a first extended copy operation;
  converting a first portion of a first anchor medium corresponding to the first portion of the volume to a read-only state, responsive to detecting the request to perform the first extended copy operation; and
  delaying allocation of a second anchor medium until a write operation targeting the first portion of the volume is received.

11. A non-transitory computer readable storage medium storing program instructions, wherein the program instructions are executable by a processor to:
  allocate an indirection layer for a volume, wherein the indirection layer is mapped directly below the volume and above a first anchor medium, wherein the first anchor medium is a logical grouping of data; wherein the indirection layer is a link between the volume and the first anchor medium of the volume;
  map read and write operations targeting the volume through the indirection layer;
  in response to detecting a request to perform a first snapshot of the volume, convert a first anchor medium from a read-write state to a read-only state;
  in response to detecting a write operation targeting the volume and subsequent to detecting the request to perform the first snapshot of the volume, allocate a second anchor medium that maps directly below the indirection layer and above the first anchor medium; and
  perform the write operation to the second anchor medium.

12. The non-transitory computer readable storage medium as recited in claim 11, wherein a size of the second anchor medium is based at least in part on one or more of a size of a write operation targeted to the second anchor medium, a historical write pattern, a size of a data structure used to identify and/or maintain medium mappings, and fragmentation of the data structure.

13. The non-transitory computer readable storage medium as recited in claim 12, wherein responsive to detecting that a number of levels in a medium hierarchy of the volume has exceeded a threshold, the program instructions are further executable by a processor to perform read optimization operations on the volume to reduce the number of levels in the medium hierarchy of the volume, and wherein responsive to determining a size of a medium mapping table has exceeded a given threshold, the program instructions are further executable by a processor to reduce the threshold for the number of levels in the medium hierarchy of the volume.

14. The non-transitory computer readable storage medium as recited in claim 11, wherein the program instructions are further executable by a processor to:
  detect a request to copy at least a first portion of the volume as part of a first extended copy operation;
  convert a first portion of a first anchor medium corresponding to the first portion of the volume to a read-only state, responsive to detecting the request to perform the first extended copy operation; and
  delay allocation of a second anchor medium until a write operation targeting the first portion of the volume is received.

* * * * *